United States Patent
Scott et al.

(10) Patent No.: US 7,254,974 B2
(45) Date of Patent: *Aug. 14, 2007

(54) SYSTEM AND METHOD FOR BENDING STRIP MATERIAL TO CREATE CUTTING DIES

(75) Inventors: Wesley Elton Scott, Kitchener (CA); Marcus de la Merced, Brighton, MI (US); Alois Slovak, Kitchener (CA)

(73) Assignee: 1500999 Ontario Inc., Kitchener, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/454,083

(22) Filed: Jun. 15, 2006

(65) Prior Publication Data

US 2006/0230805 A1    Oct. 19, 2006

Related U.S. Application Data

(63) Continuation of application No. 11/265,665, filed on Nov. 2, 2005, now Pat. No. 7,082,804, which is a continuation of application No. 10/615,704, filed on Jul. 9, 2003, now abandoned.

(51) Int. Cl.
*B21D 5/04* (2006.01)
*B21D 37/16* (2006.01)

(52) U.S. Cl. .......................... 72/294; 72/307; 72/342.1; 72/342.96

(58) Field of Classification Search ............... 72/307, 72/319, 318, 39, 40, 164, 342.1, 342.94, 72/342.96, 107.8, 294; 76/107.8
See application file for complete search history.

(56) References Cited

U.S. PATENT DOCUMENTS

| | | | |
|---|---|---|---|
| 3,584,660 A | 6/1971 | Paine | |
| 3,845,650 A | 11/1974 | Romanov | |
| 3,991,462 A * | 11/1976 | Engel | ........................ 29/605 |
| 4,061,005 A | 12/1977 | Kawanami | |
| 4,373,371 A | 2/1983 | Liu | |
| 4,562,754 A | 1/1986 | Archer et al. | |
| 4,594,872 A | 6/1986 | Nordlof | |
| 4,773,284 A | 9/1988 | Archer | |
| 4,802,357 A | 2/1989 | Jones | |
| 5,187,959 A | 2/1993 | Davi | |
| 5,461,893 A | 10/1995 | Tyler | |

(Continued)

FOREIGN PATENT DOCUMENTS

CA           2120037          12/1994

(Continued)

*Primary Examiner*—Daniel C. Crane
(74) *Attorney, Agent, or Firm*—Dann, Dorfman, Herrell and Skillman; Henry H. Skillman

(57) ABSTRACT

The present invention is a bending machine for bending material such as steel to form cutting dies for products such as cloth, leather or the like. Coiled material is fed through a material washer, straightener and printer by a material feeder to a bending head. If required the material is forwarded through the bending head to a heating unit and retracted to the bending unit to aid in bending. A nicking tool is also provided ahead of the bending tool to nick the material. The nicks enable the cutting die to cut notches in the product being cut. A support surface at the output end of the machine supports the material as it is bent into the required form.

18 Claims, 19 Drawing Sheets

U.S. PATENT DOCUMENTS

| | | | |
|---|---|---|---|
| 5,463,890 A | 11/1995 | Tachibana | |
| 5,495,741 A | 3/1996 | Yamada | |
| 5,507,168 A | 4/1996 | Mizukawa | |
| 5,676,032 A | 10/1997 | Johnson | |
| 5,743,124 A | 4/1998 | Sugiyama et al. | |
| 5,771,725 A | 6/1998 | Mizukawa | |
| 5,836,188 A | 11/1998 | Mahan et al. | |
| 6,158,264 A | 12/2000 | Mizukawa | |
| 6,205,830 B1 * | 3/2001 | Voges | 72/40 |
| 6,227,026 B1 | 5/2001 | Mizukawa | |
| 6,378,184 B1 | 4/2002 | Bota | |
| 6,487,887 B2 | 12/2002 | Yamada | |
| 6,619,094 B2 | 9/2003 | Juhl | |
| 2003/0061682 A1 | 4/2003 | Yamano et al. | |

FOREIGN PATENT DOCUMENTS

| | | |
|---|---|---|
| EP | 0 317 837 A1 | 5/1989 |
| EP | 0 626 221 | 11/1994 |
| EP | 0 657 231 B1 | 9/1998 |
| EP | 0 962 274 B1 | 12/1999 |
| EP | 1 129 799 | 9/2001 |
| EP | 1 157 760 | 11/2001 |
| EP | 0 962 273 B1 | 10/2002 |
| EP | 1 264 648 | 12/2002 |
| GB | 612 939 | 11/1948 |
| JP | 02-020819 | 1/1990 |
| JP | 06-328133 | 11/1994 |
| JP | 07-090276 | 4/1995 |
| JP | 08-099123 | 4/1996 |
| JP | 08-192310 | 7/1996 |
| JP | 08-215760 | 8/1996 |
| JP | 08-243634 | 9/1996 |
| JP | 09-030576 | 2/1997 |
| JP | 09-174498 | 7/1997 |
| JP | 10-058041 | 3/1998 |
| JP | 08-215761 | 8/1998 |
| JP | 11-254048 | 9/1999 |
| JP | 2000-334519 | 12/2000 |
| JP | 2001-239339 | 5/2001 |
| JP | 2001-353628 | 12/2001 |
| JP | 2003-001382 | 1/2003 |
| WO | WO95/00266 | 5/1995 |
| WO | WO 02/102529 | 12/2002 |

\* cited by examiner

SYSTEM AND METHOD FOR BENDING STRIP MATERIAL TO CREATE CUTTING DIES

RELATED APPLICATION

The present application is a continuation of U.S. application Ser. No. 11/265,665 filed Nov. 2, 2005, now U.S. Pat. No. 7,082,804 which is a continuation of U.S. patent application Ser. No. 10/615,704 filed Jul. 9, 2003, now abandoned.

FIELD OF THE INVENTION

The present invention relates generally to a system and method for bending strip material with a sharp cutting edge, such as steel, to create cutting dies.

BACKGROUND OF THE INVENTION

When cutting fabric or other materials to meet a specific shape, manufacturers make use of a cutting die. A cutting die is typically a band of steel bent into a desired shape and having a sharpened edge. A cutting die may be then mounted to a base to keep it in place while being used within a press to cut materials. In other uses, such as the cutting of leather the die is not mounted to a base, but attached directly to a cutting device or placed directly on the material to be cut.

Traditionally, a cutting die was bent by hand to conform to the specific shape required. As with classic workmanship, this provided an excellent product. Due to increased labour costs such a method is often no longer economically viable. Thus there has emerged a need to mechanically produce a cutting die in an accurate and cost efficient manner.

The present invention addresses this need.

SUMMARY OF THE INVENTION

The present invention is directed to a bending machine for producing cutting dies. The bending machine may comprise:
  a) a feeder for accepting the material from the supply device;
  b) a bending tool accepting the material from said feeder for bending, and
  c) a support surface for supporting the material upon output from the bending tool.

The bending machine further comprises a supply device having a turntable for supporting a coil of material.

The bending machine further comprises a straightener, for the purpose of straightening the material prior to the material entering the bending tool.

The bending machine further comprises a heating unit for heating the material prior to bending or nicking said material.

The bending machine further comprises a nicking unit, to create nicks in the material, the nicking unit utilizing a male die and a female die.

The bending machine further comprises a printing unit, the printing unit located before the bending tool to print information on the material.

The present invention is also directed to a method of creating a cutting die. The method may comprise the steps of:
  a) extracting material from a source of material;
  b) feeding the material to a bending tool;
  c) bending the material;
  d) supporting the material after bending;
  e) repeating steps a) through d) until the said cutting die is complete; and
  f) detaching said cutting die from said source of material, after the completion of step e).

The method of creating a cutting die further comprising the step of straightening the material once the material has been extracted from the source of material but before bending the material.

The method of creating a cutting die further comprising the step of heating the material prior to bending the material.

The method of creating a cutting die further comprising the step of nicking the material.

The method of creating a cutting die further comprising the step of printing information on the material prior to the material being bent by the bending tool.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which.

DETAILED DESCRIPTION OF THE INVENTION

Figure 1A:
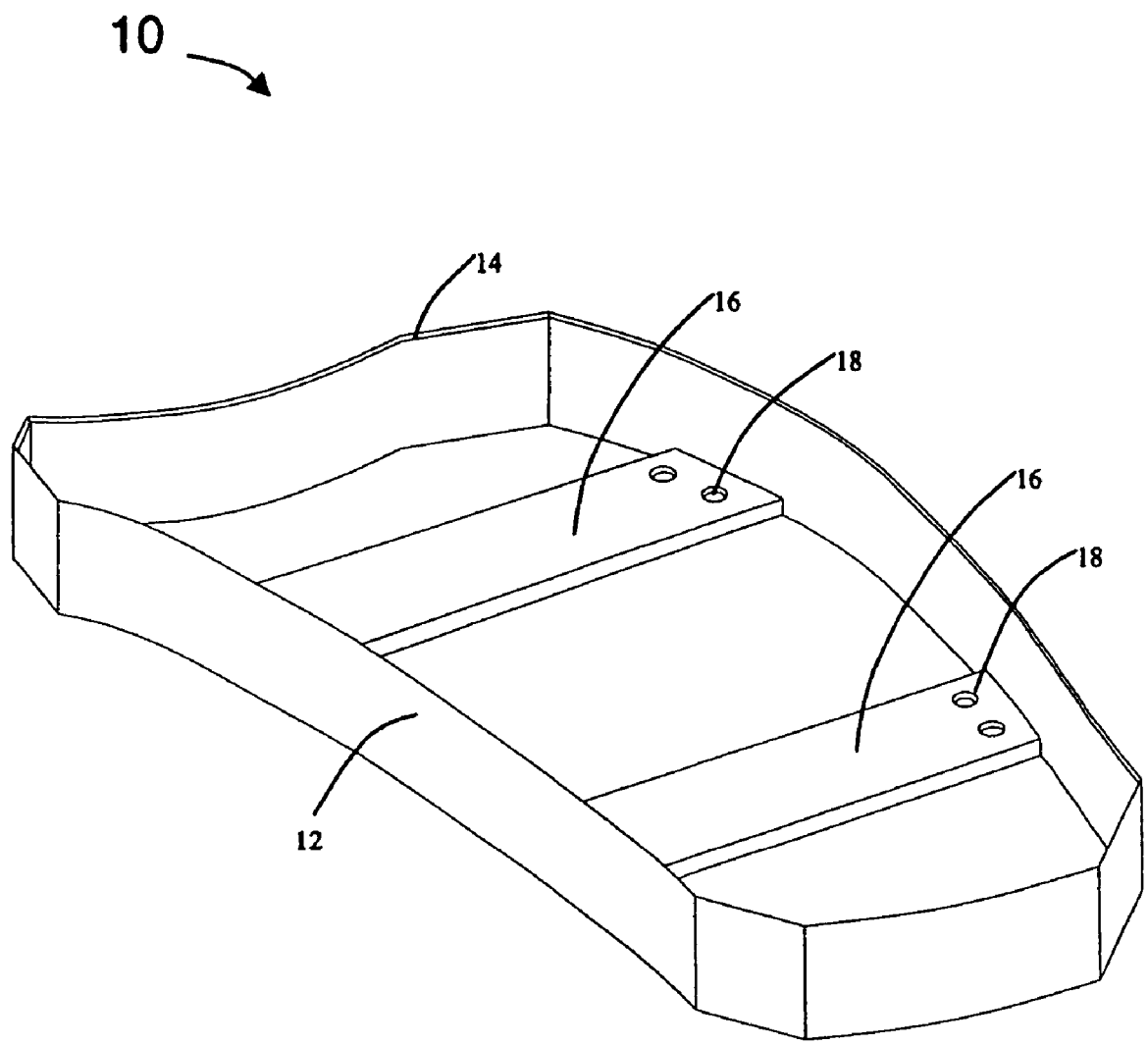
FIG. 1a is an isometric view of cutting die.

The production of an accurate cutting die is far from simple. To aid the reader in understanding the complexity of a cutting die, we refer now to FIG. 1a. FIG. 1a is an isometric view of cutting die shown generally as 10. Cutting die 10 is constructed from a piece for material 12 bent at various angles. Material 12 has a cutting edge 14. Cutting edge 14 may be one of many different shapes depending upon the product to be cut by the die 10. Material 12 may have many different characteristics, one having a cutting edge 14 that is heat treated, sharpened and serrated. Die 10 may be reinforced by braces 16 to ensure that die 10 does not deform during use. If used, braces 16 would typically be welded to material 12. Braces 16 may also optionally include one or more mounting holes 18 to allow die 10 to be attached to a cutting board or press (not shown).

Figure 1B:
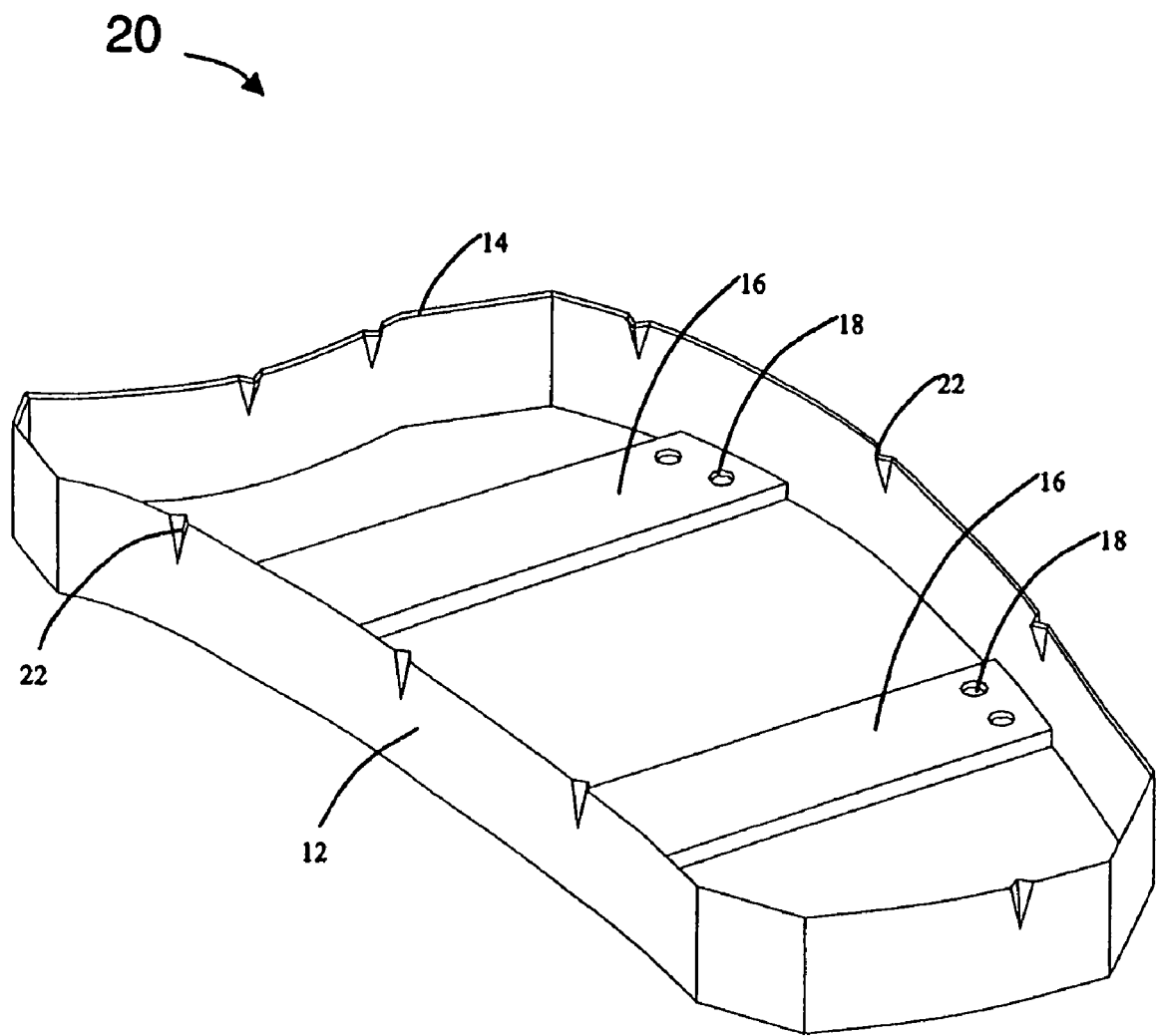
FIG. 1b is an isometric view of a cutting die with nicks.

Referring now to FIG. 1b an isometric view of a cutting die with nicks is shown generally as 20. Cutting die 20 is of the same construction as cutting die 10 but with the addition of one or more nicks 22. Nicks 22 are utilized to create notches in the cut out product to allow pieces of the product to be efficiently sewn together. For example, in the case of automobile upholstery, the cut out product may require many folds to assume an irregular shape, notches created by nicks 22 aid in the folding and in connecting pieces of cut out product. Notches also aid in aligning pieces of cut out product so that they may be sewn together accurately. Nicks 22 may take on a variety of shapes and sizes, including running the full vertical height of material 12.

Figure 2:
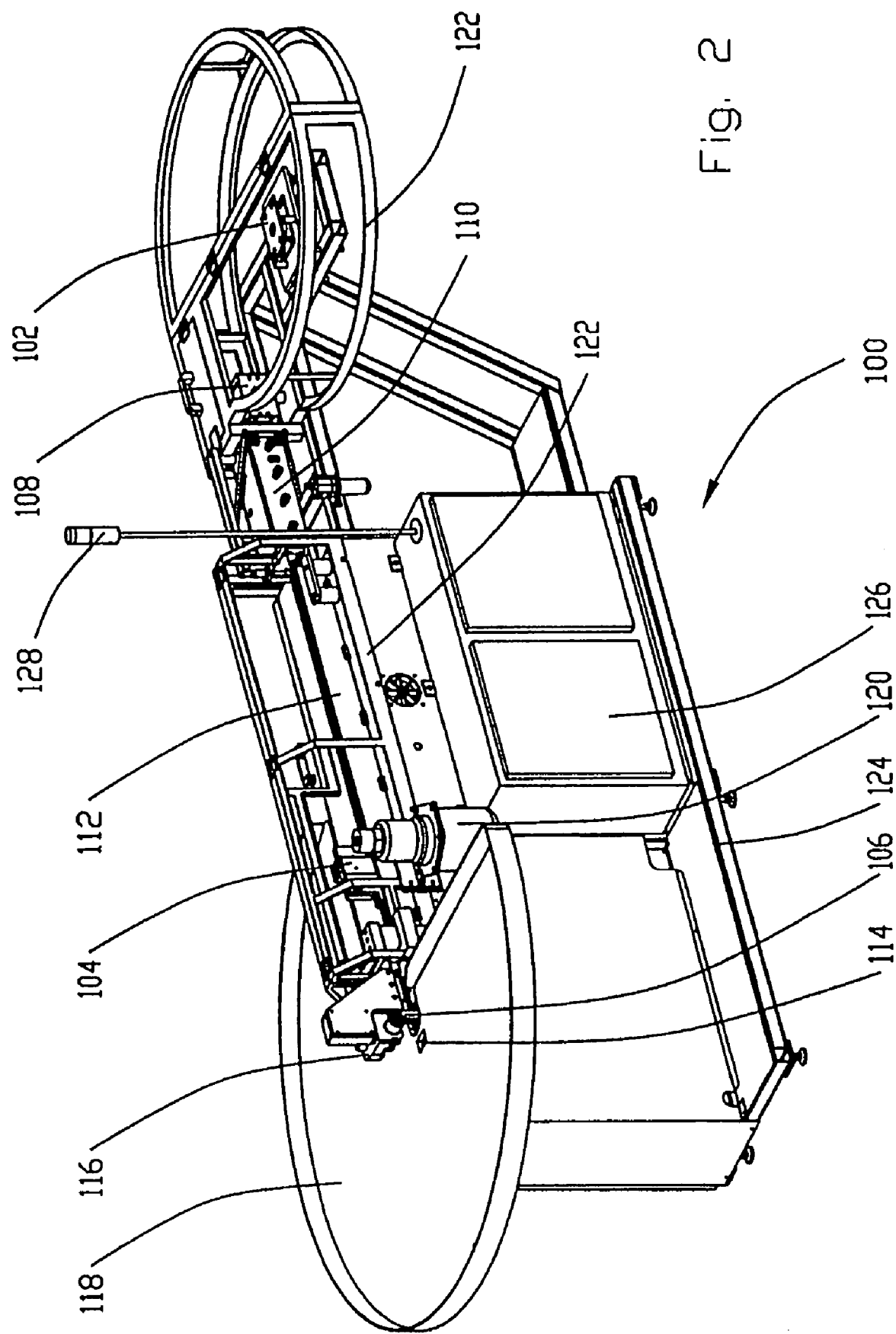
FIG. 2 is an isometric view of the bending machine comprising the present invention.

Referring now to FIG. 2, an isometric view of a bending machine of the present invention is shown generally as 100. Bending machine 100 accepts a roll of material such as steel or another suitable material from coil turntable 102 which is fed by material feeder 104 to bending tool 106 to create a cutting die. Coil turntable 102 is capable of both feeding material downstream and reversing direction to receive material. As the material is removed from coil turntable 102 it undergoes a cleaning by material cleaner 108, the details of which are provided with the descriptions of FIGS. 7 and 8. After passing through material cleaner 108 the material is straightened by material straightener 110, the details of which are provided with the description of FIGS. 9, 10, 11 and 12.

The material is guided to bending tool 106 along material guide 112, which serves as a base for material feeder 104. Bending tool 106 is capable of bending the material in a series of angles as determined by a computer control system. The details of the computer control system are provided with the description of FIG. 14. In some cases it may be necessary to heat the material prior to bending. Depending upon the characteristics of the material being bent the computer control system determines if heating is required to aid in bending. Experimentation on steel having a height on the order of 19 mm to 50 mm and having a thickness on the order of 2 mm to 3 mm has indicated that angles on the order of 45 degrees are more precisely bent if the region to be bent is heated. Further when the cutting edge of the material to be bent is serrated, the application of heat prior to bending ensures that the serrated edge does not fracture and remains intact. The computer control system determines when material should be heated before bending; this depends upon the bending angle and the characteristics of the material. When the material is to be bent, it is advanced to heating unit 114 by material feeder 104 where it is heated and then returned to bending tool 106 for bending. In some cases the material will need to be "nicked". In such situations the material is heated by heating unit 114 in the region of the nick, and nicking tool 116 is invoked to provide a nick in the required position. Once nicked material 12 is retracted toward bending tool 106 for the next bend to be made. Nicking is utilized to provide a notch in the cut out product so that the cut out product may be efficiently sewn into a finished product. For example, in the case of automobile upholstery, the cut out product may require many folds to assume an irregular shape, the notches aid in the folding and in connecting pieces of cut out products. Notches also aid in aligning pieces of cut out product so that they may be sewn together accurately.

As the material is bent it will assume a variety of angles and thus the need for support surface 118. Support surface 118 provides a large and stable surface for the material as it exits from bending tool 106. As can be appreciated the support surface 118 may take on a variety of forms. In the current embodiment support surface 118 takes the form of a large work table. The table provides an efficient support surface for the output of bending machine 100 during the creation of a cutting die.

Bending machine 100 is capable of bending a wide variety of materials and in typical use bends steel having a height on the order of 19 mm to 50 mm and having a thickness on the order of 2 mm to 3 mm. In order to bend such material, bending tool 106 is powered by a motor having sufficient torque to bend the material. It is not the intent of the inventors to limit the present invention to the specific type of bending head shown, any form of bending head capable of meeting the requirements of the bending machine may be utilized.

Many of the components of bending machine 100 are powered through the use of pneumatic cylinders and valves. One such example of the use of pneumatic power is pressure booster 120. Pressure booster 120 accepts air as input and utilizes an oil powered cylinder to drive nicking tool 116.

Bending machine 100 has material guards 122 to prevent any interference with the material and to shield the operator from injury. Bending machine 100 is supported by a machine frame 124. Within frame 124 there is a control cabinet 126 which houses the computer control system for machine 100 (See FIG. 14).

Bending machine 100 is topped with a beacon light 128. Beacon light indicates the operational status of bending machine 100. The colours of beacon light 128 may be implementation defined to describe the status of machine 100, such as working, not working, or error. Bending machine 100 also has mounted to it two emergency stop buttons (not shown). When activated by the operator all power to bending machine 100 is shut down. In such a situation beacon light 128 will indicate a status of not working.

Figure 3:
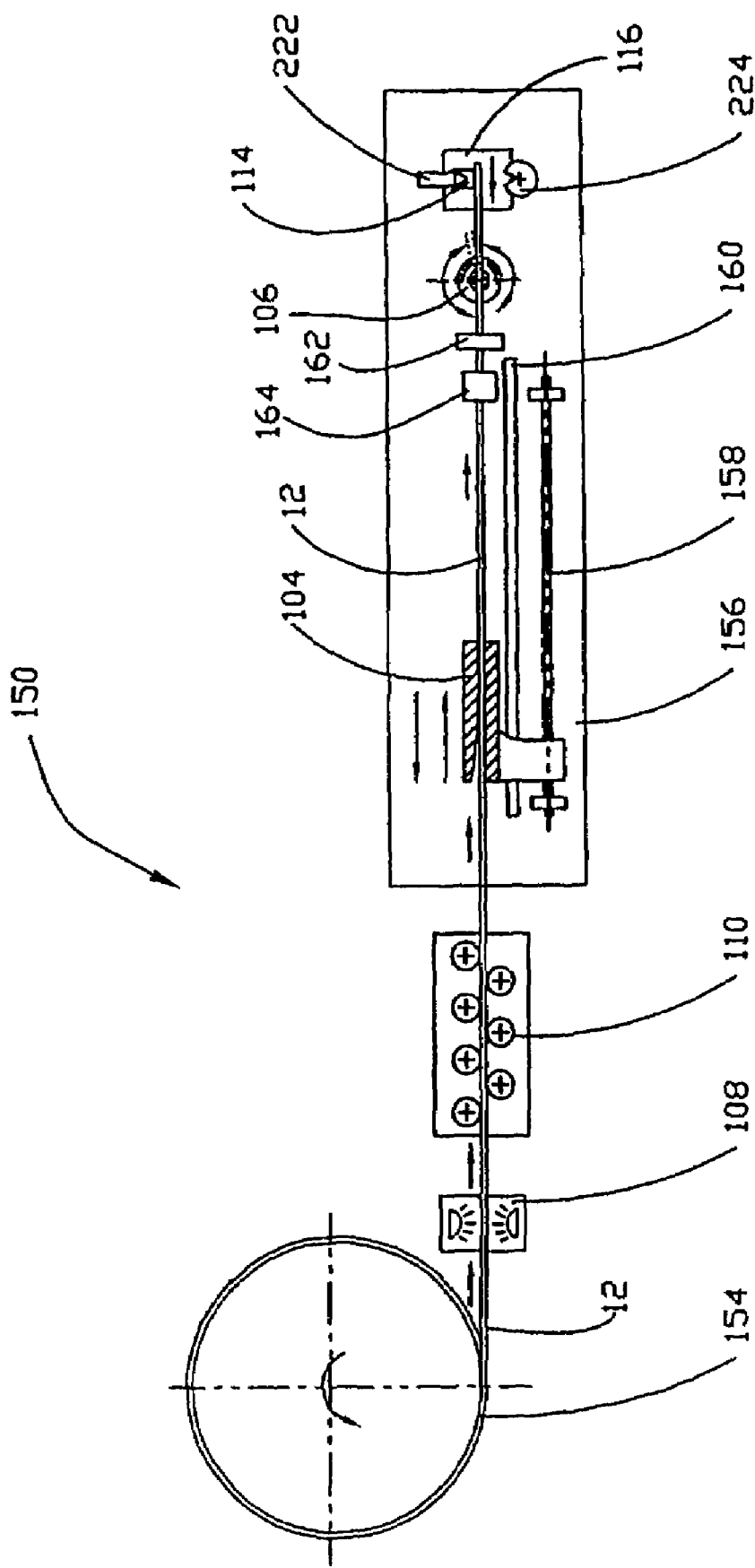
FIG. 3 is a top view of a portion of the present invention.

Referring now to FIG. 3, a top view of a portion of the present invention is shown generally as 150. Material 12 is fed from material coil 154 (supported by coil turntable 102), by material feeder 104. Material feeder 104 is controlled by the computer control system and consists of an air powered clamp to grip material 12. Although the present invention works upon material in the form of a coil, it may easily be adapted to deal with straight stock. Material feeder 104 is capable of moving in two directions, either extracting material from coil 154 toward bending head 106 or returning material to coil 154 as required. Material 12 is cleaned by material cleaner 108, the details of which are provided with the descriptions of FIGS. 7 and 8. Material 12 is next straightened by material straightener 110, the details of which are provided with the description of FIGS. 9, 10, 11 and 12. Material feeder 104 is driven linearly by material feeder screw 158 along guide 160. Guide 160 ensures that material feeder 104 travels linearly with minimal deviation. Forward clamping device 162 is engaged to clamp material 12 when material feeder 104 is released from material 12 to return to a home position. When material feeder 104 returns to a home position to clamp material 12 forward clamping device 162 ensures that material 12 remains in position. Printing unit 164 serves to print information regarding the die being manufactured; such information would typically include the logo of the user a die number and the date of manufacture. Printing unit 164 prints information in a continual spaced pattern as determined by the computer control system. Material feeder 104 and its associated components are mounted to machine plate 156, which serves as the working surface for machine 100. If no heating or nicking of material 12 is required, material 12 is bent to a desired angle by bending tool 106. If nicking or heating is required, material 12 is advanced through bending tool 106 to heating unit 114 and/or nicking tool 116 and then retracted to bending tool 106 to be bent. Nicking tool 116 comprises two main components, male die 222 and female die 224.

Figure 4:
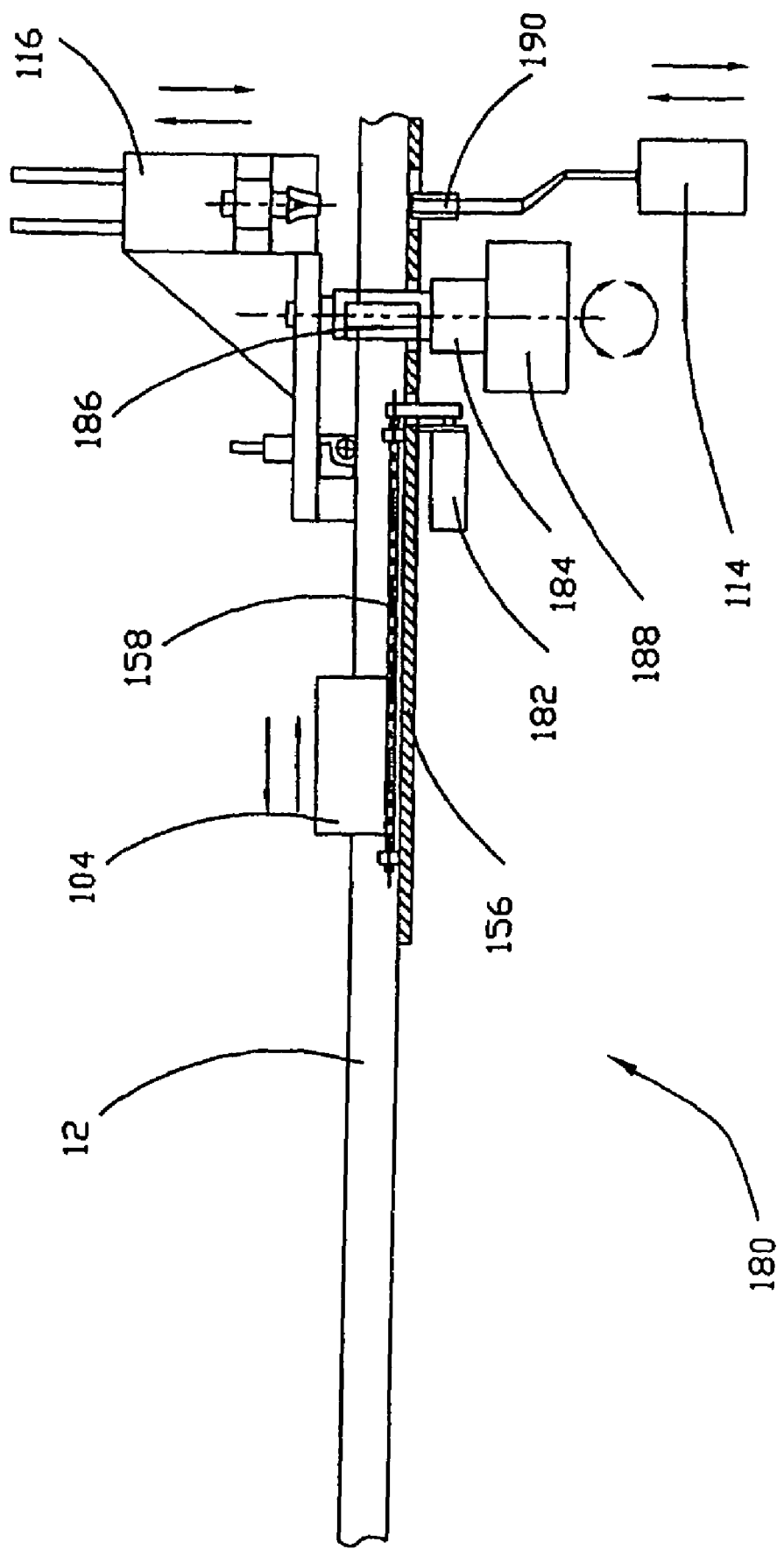
FIG. 4 is a side view of a portion of the present invention.

Referring now to FIG. 4, a side view of a portion of the present invention is shown generally as 180. The feeding of material 12 is done by material feeder 104 under the control of material feeder drive 182. Material feeder drive 182 utilizes material feeder screw 158 to drive material feeder 104. Material feeder drive 182 operates in both forward and reverse directions as required by the computer control system. Bending tool 106 comprises three components, rotary portion 184, stationary portion 186, and bending tool drive 188. Many configurations of bending tools may be utilized. It is not the intent of the inventors to restrict the present invention to the use of the specific bending tool shown.

Nicking tool 116 may be lowered as required to create a nick in material 12. When not in use nicking tool 116 is retracted to be above material 12. Heating unit 114 utilizes a heat concentrator 190 to heat material 12 to aid in bending and nicking. In the current embodiment heating unit 114 and nicking tool 116 are arranged so that once material 12 is in a position to be nicked, heating unit 114 is raised to heat the material prior to nicking and nicking tool 116 descends to provide a nick. Such a configuration ensures that material 12 need not be moved while being heated and nicked. This configuration also ensures that heating unit 114 does not interfere with the bending of material 12.

Figure 5:
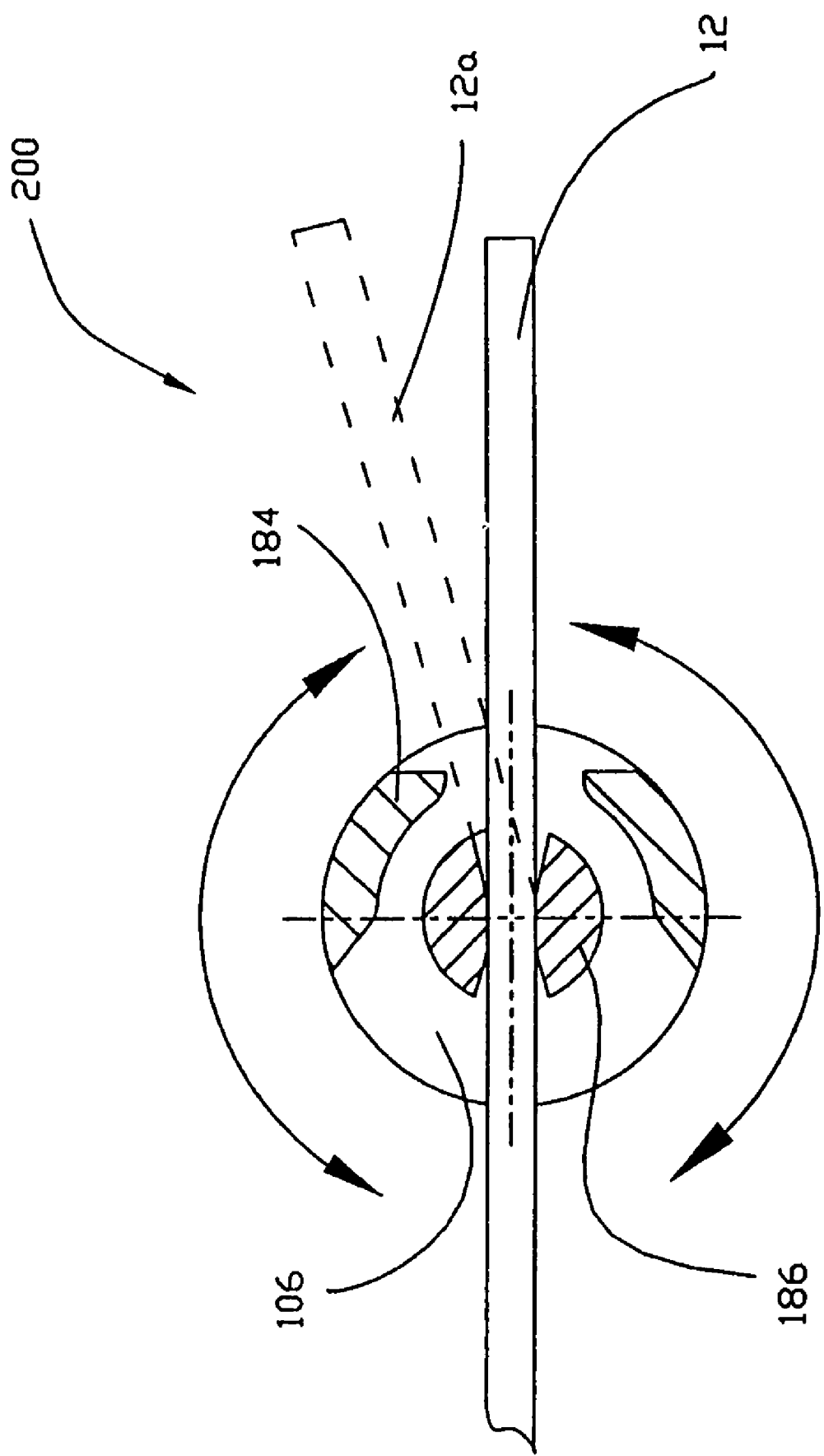
FIG. 5 is a top view of the bending tool.

Referring now to FIG. 5, a top view of the bending tool is shown generally as 200. Bending tool 106 comprises rotary portion 184 and stationary portion 186. Material 12 is fed through stationary portion 186 and rotary portion 184 driven by bending tool drive 188 rotates in the required direction to bend material 12. The dashed lines shown as feature 12a indicate how material 12 may be bent, by rotating rotary portion 184 in a counter-clockwise direction. Bending tool 106 may bend material 12 through a wide range of degrees in either a clockwise or a counter-clockwise direction. A user may set the limit of bending. Typically the bending range is from zero to 100 degrees. As material 12 may spring back after being bent, the user may program the computer control system (see FIG. 14) to adjust for spring back for a particular material at a particular angle. Bends in the form of arcs may be achieved through a progressive series of small bends. When the bending of material 12 is complete, rotary portion 184 is rotated in alternate directions until material 12 breaks, thus ending the process of creating a die. The inventors have considered adding a cutting portion to the present invention to avoid the breaking step. However, as the material 12 may require heating and/or nicking, such a device would conflict with the heating and nicking units and provide little or no advantage over the existing configuration. Although bending tool 106 serves as a cutter for the material, in the case of relatively thin material, a separate cutter may be required, as it may be too flexible to be broken by rotary portion 184.

Figure 6:
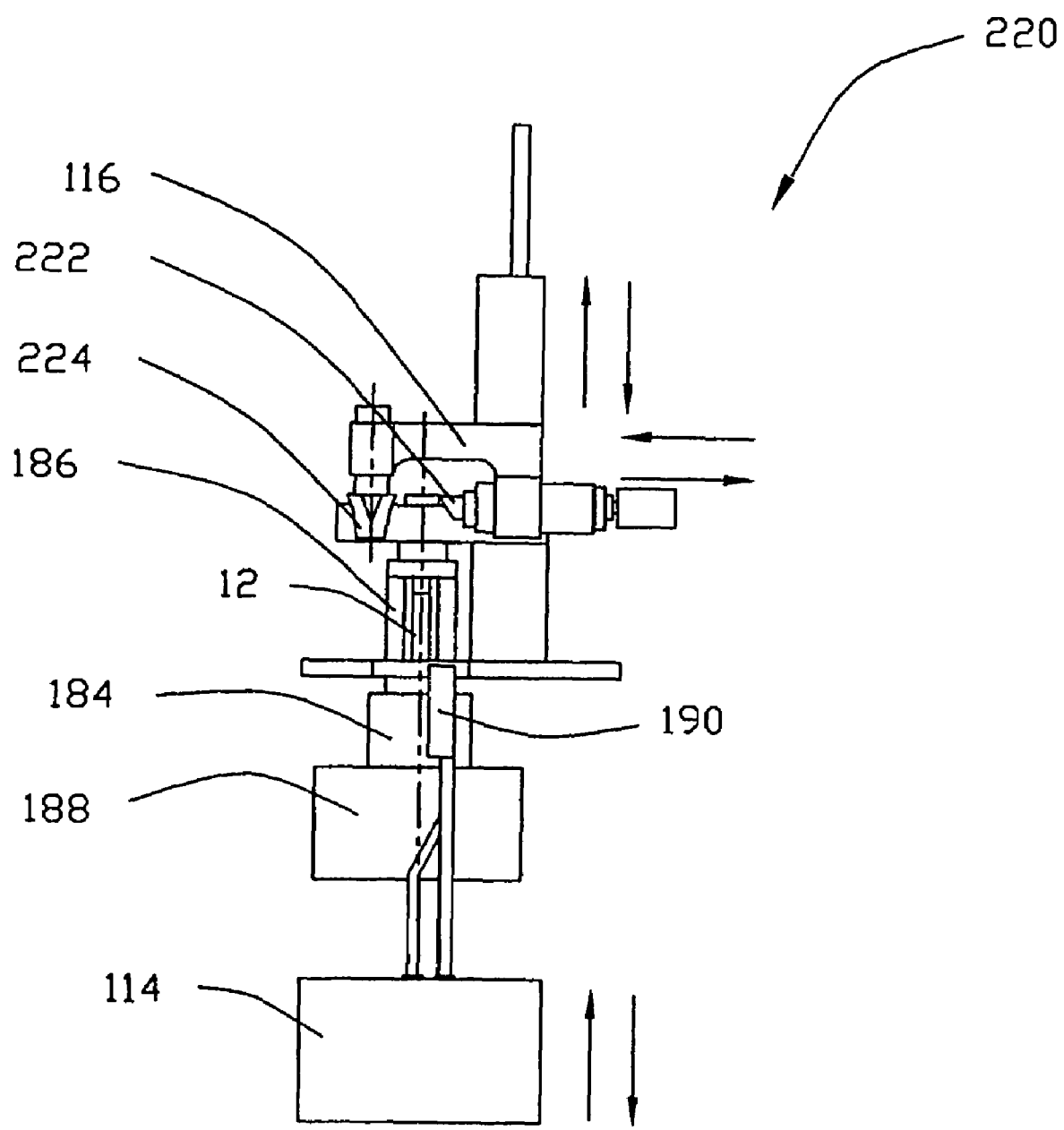
FIG. 6 is an end view of the output end of the present invention.

Referring now to FIG. 6 an end view of the output end of the present invention is shown generally as 220. Nicking tool 116 comprises a male die 222 and a female die 224. When nicking tool 116 is lowered to material 12, male die 222 is activated to move toward female die 224, thus creating a nick in material 12. In the current embodiment female die 224 is circular and may be rotated to present one of a plurality of nicking forms to male die 222. Any number of male or female dies may be interchanged to create a specific type of notch. Should material 12 require heating, heating unit 114 is raised so that heat concentrator 190 is adjacent to material 12 and lowered once heating is completed. This configuration ensures that heating unit 114 does not interfere with the bending of material 12.

Figure 7:
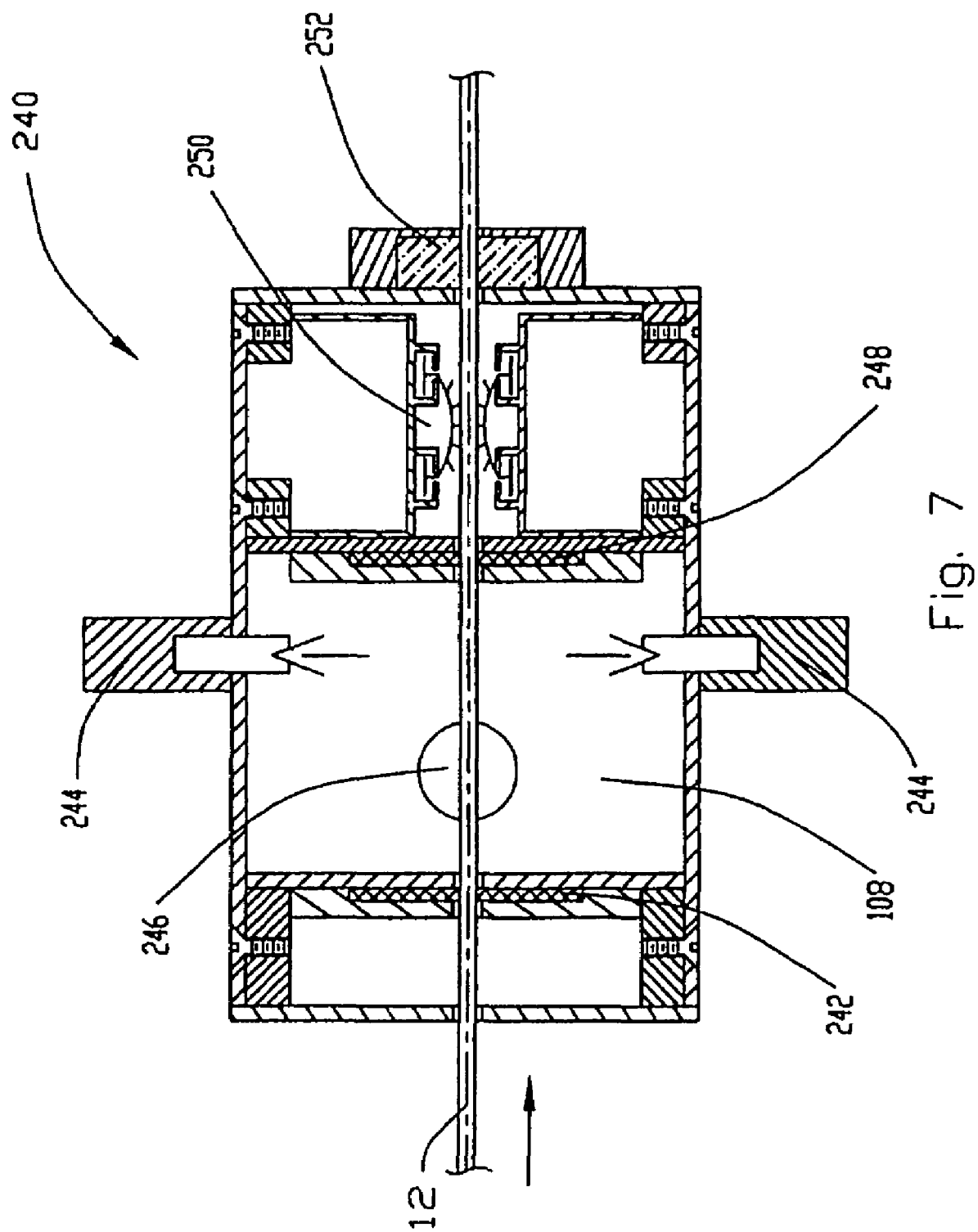
FIG. 7 is a top view of a material cleaner.

Referring now to FIG. 7 a top view of the material cleaner 108 is shown generally as 240. In this view, material 12 passes through material cleaner 108 from left to right. Material 12 passes first though a first seal 242. In the current embodiment seal 242 is made of a material such as neoprene or the like. Seal 242 provides a seal to ensure that cleaning fluid used within material cleaner 108 is remains within cleaner 108. Material 12 is then subjected to a cleaning solution, applied by one or more spray nozzles 244. A cleaning solution that has been found to be effective is Crystal Simple Green, made by Sunshine Makers, Inc. of Huntington Harbor, Calif. The used cleaning solution exits material cleaner 108 through drain 246. The used cleaning solution is then skimmed to remove the surface oil and recycled through spray nozzles 244. Material 12 next passes through second seal 248; seal 248 is of the same construction as first seal 242. Second seal 248 aids in removing any loose particles from material 12 as well as any remaining cleaning solution which are both returned to drain 246. Material 12 then passes through a pair of threshold wipers 250, which in the current embodiment take the form of a typical rubber door seal with a plurality of fingers. Threshold wipers 250 return any remaining cleaning liquid to drain 146. Finally before exiting material cleaner 108, material 12 is cleaned by felt wiper 252. Felt wiper 252 is may be made of an absorbent material such as felt and serves to remove any remaining moisture and surface debris from material 12. Wipers 242, 248, 250 and 252 are easily replaced by opening the top of material cleaner 108.

One advantage in utilizing material cleaner 108 is that if material 12 is to be heated by heating unit 114, cleaned material will result in fewer emissions due to the burning of any lubricants or other substances on the surface of material 12. This reduces the requirements for any exhaust system that may be needed to exhaust fumes from the heating process. A second advantage is that once the material has been cleaned of oil and grease it retains print information printed by printing unit 164.

Figure 8:
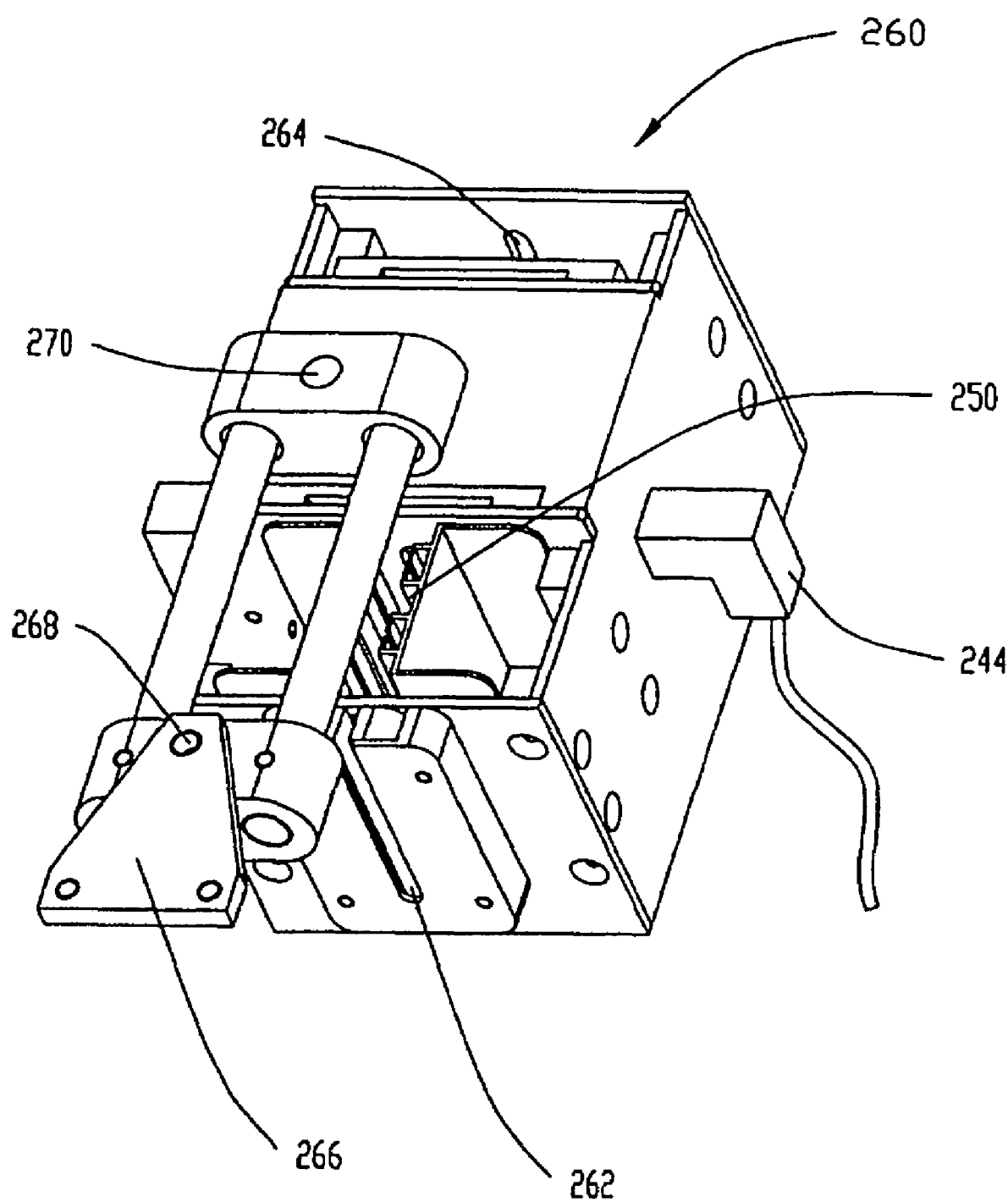
FIG. 8 is an isometric view of the material cleaner.

FIG. 8 is an isometric view of the material cleaner 108, shown generally as 260. FIG. 8 shows cleaner 108 with the top facing the viewer. Material 12 enters cleaner 108 through entrance port 262 and exits through exit port 264. Features described earlier with reference to FIG. 7 include spray nozzle 244 and threshold wiper 250. Material cleaner 108 is mounted to bending machine 100 via mounting bracket 266. Mounting bracket 266 has two pivot points, first pivot point 268 and second pivot point 270. Pivot points 268 and 270 allow material cleaner 108 to swivel about material 12. As material 12 exits from coil 154 it retains some curvature as it enters material cleaner 108. When material 12 is engaged by material straightener 110 it is locked in a rigid position. Pivot points 268 and 270 allow material cleaner 108 to adjust to the curvature of material 12 while permitting a straight feed into material straightener 110. Although in the current embodiment material cleaner 108 is situated before material straightener 110, it may also be situated after material straightener 110.

Figure 9:
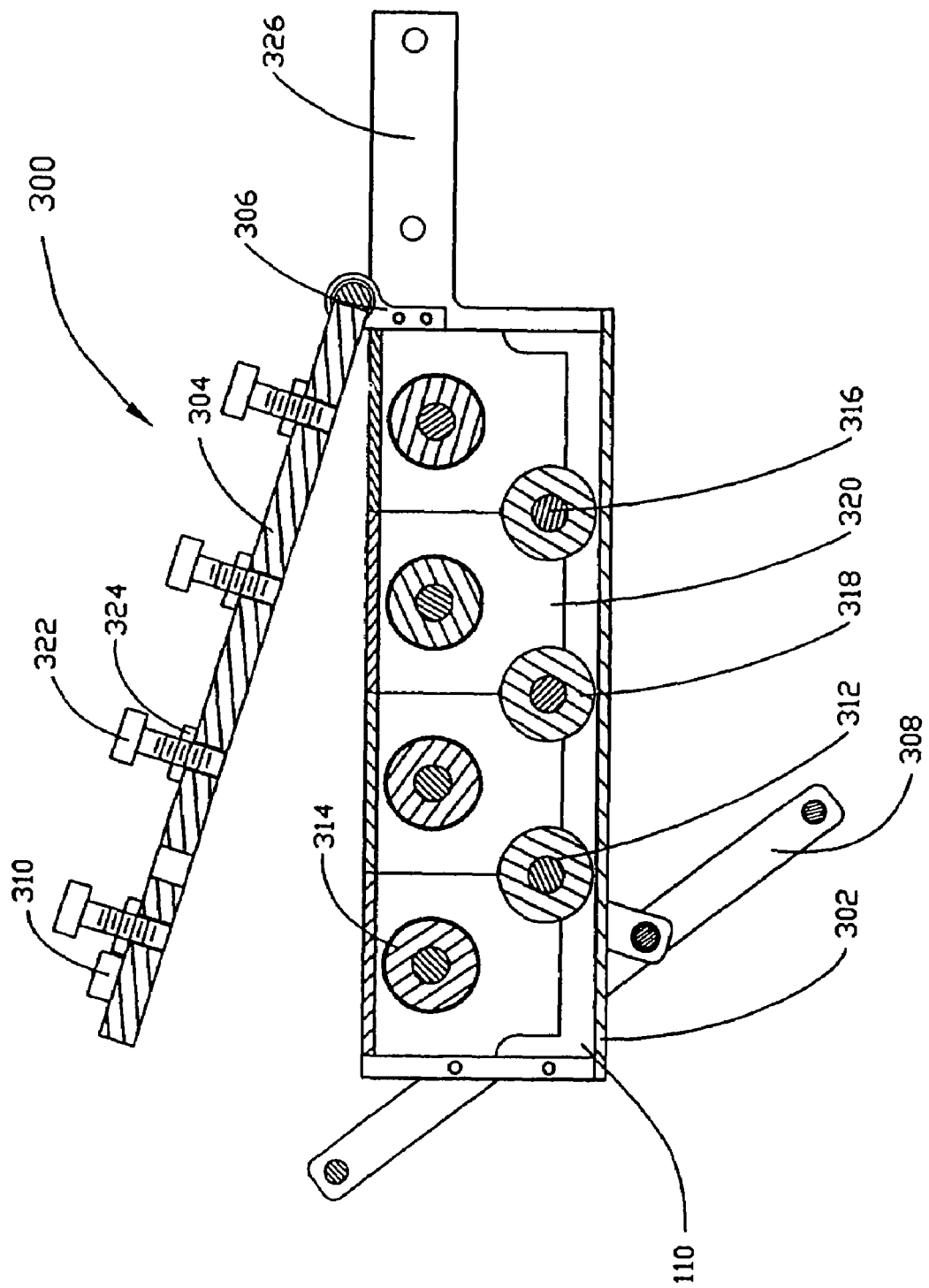
FIG. 9 is a bottom view of material straightener with the lid open.

Referring now to FIG. 9 a bottom view of material straightener 110 with the lid open is shown generally as 300. In this view, material 12 would enter at the left of the material straightener 110 and exit on the right. Material straightener 110 comprises a body 302, which is connected to a lid 304 by a hinge 306. Hinge 306 permits lid 304 to be opened allowing access to the interior of material straightener 110. Lid 304 is opened and closed by the use of swing handle 308. In the closed position, swing handle 308 abuts a pair of adjustable stops 310 to keep cover 304 firmly in place. Adjustable stops 310 may be moved to allow for wear and to ensure a tight contact with swing handle 308. As material 12 passes through material straightener 110 it is straightened by a series of rollers, namely front rollers 312 and rear rollers 314. Rear rollers 312 contact the rear of material 12 and front rollers contact the front. Each of rollers 312 and 314 comprise a shaft 316 and a plurality of discs 318. In the current embodiment each roller 312 and 314 comprises five discs. Rear rollers 314 are mounted in an insert 320. Each Insert 320 is removable from material straightener 110 to aid in maintenance. Further, each insert 320 may be adjusted through the use of tightening bolt 322 and tightening nut 324 to increase or decrease the distance between front and rear rollers. This allows the operator to apply more or less pressure to the straightening of the material within a specific portion of material straightener 110, to allow for any bends in the material 12 as it is fed from coil turntable 102. Material straightener 110 is mounted to bending machine 100 by mounting bracket 326.

Figure 10:
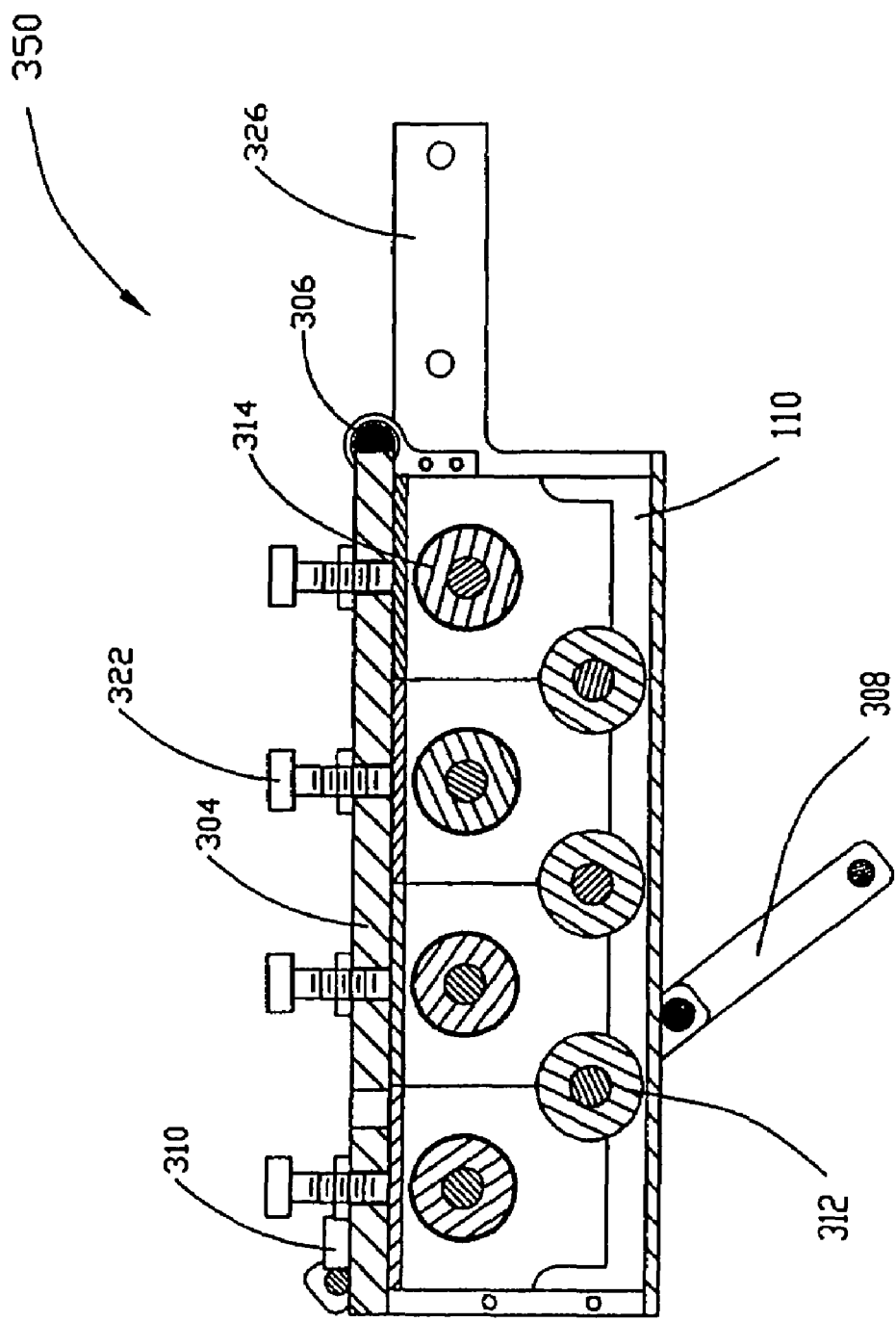
FIG. 10 is a bottom view of the material straightener with the lid closed.

Referring now to FIG. 10 a bottom view of material straightener 110 with the lid closed is shown generally as 350. In the closed position, swing handle 308 is abutted directly against a pair of adjustable stops 310, thus keeping lid 304 firmly closed.

Figure 11:
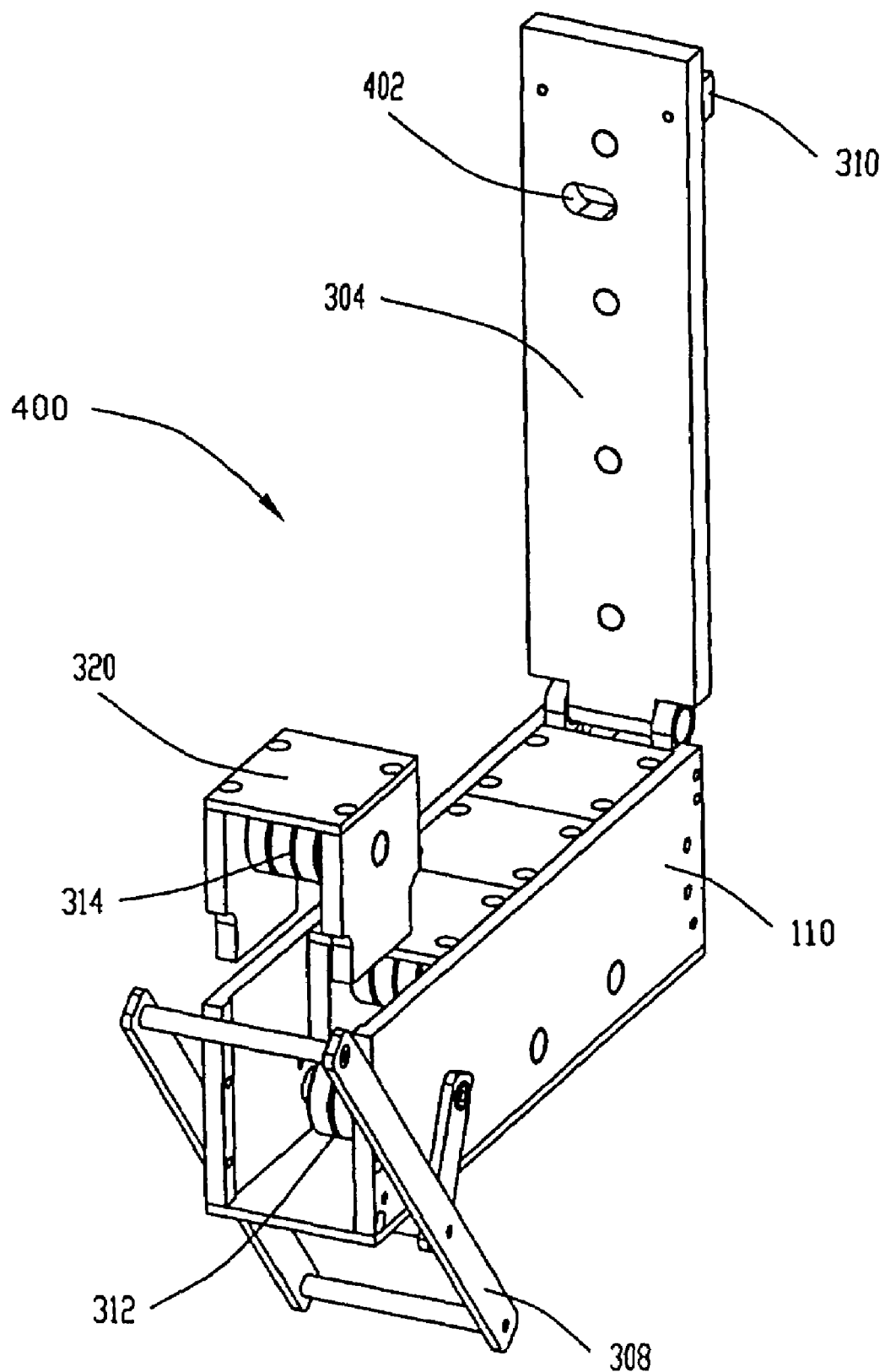
FIG. 11 is an isometric view of the material straightener with the lid open.

Referring now to FIG. 11 an isometric view of the material straightener 110 with the lid open is shown generally as 400. An insert 320 is shown removed from the body of material straightener 110. Proximity switch port 402 allows for the installation of a proximity switch in material straightener 110. A proximity switch indicates to the computer control system if material 12 is within material straightener 110. As the computer control system is aware of how much material is required to make a die, the information from the proximity switch may be utilized to cancel the current bend or alert the operator to load more material. Although not shown, proximity switches may be installed in any number of positions in bending machine 100 to monitor the existence of material 12.

Figure 12:
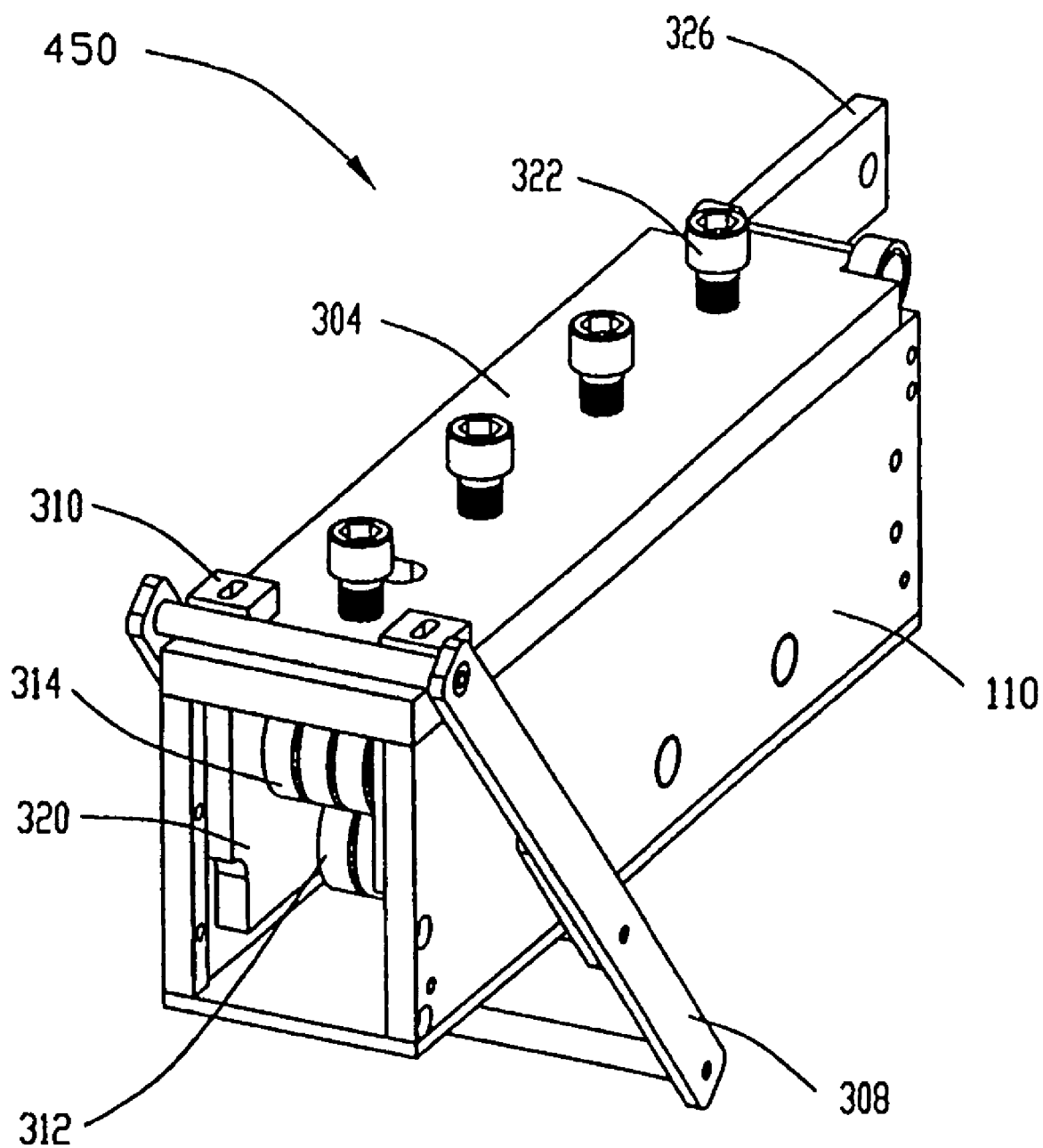
FIG. 12 is an isometric view of the material straightener with the lid closed.

Referring now to FIG. 12 an isometric view of the material straightener 110 with the lid closed is shown generally as 450. FIG. 12 illustrates how swing handle 308 abuts adjustable stops 310 to firmly close lid 304.

Figure 13:
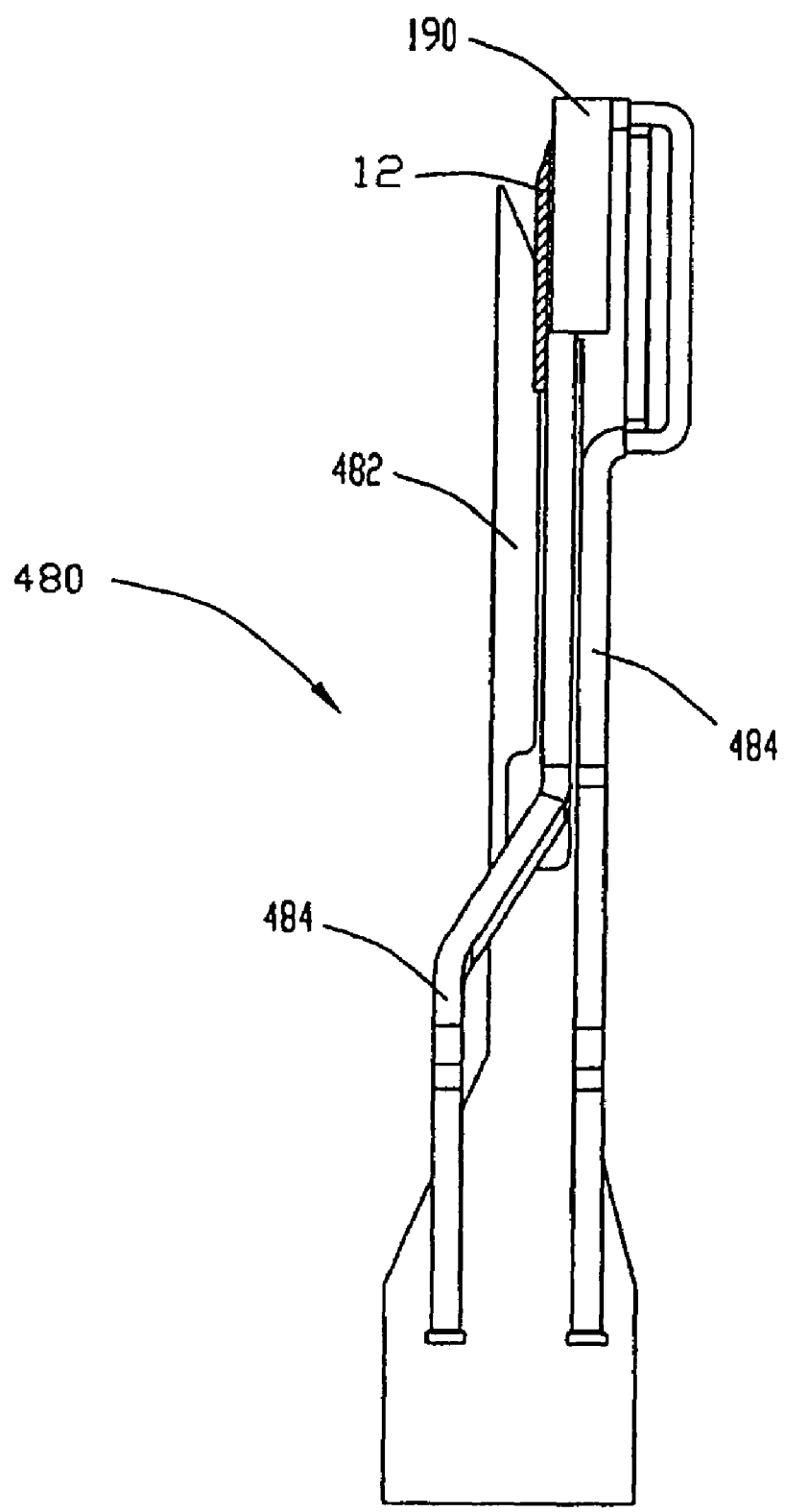
FIG. 13 is side view of a portion of the heating unit.

Referring now to FIG. 13 a side view of a portion of heating unit 114 is shown generally as 480. Material 12 is guided toward heat concentrator 190 by shoe guide 482. Shoe guide 482 ensures that any material that is slightly less than straight is pressed toward heat concentrator 190 to achieve consistent heating.

Material 12 is shown as not being adjacent to the complete heating surface of heat concentrator 190. This is the position for heating material 12 prior to creating a nick that does not extend for the full height of material 12. In the case of bending, heat concentrator 190 would be in a lower position to be completely adjacent to material 12. Should a nick be required for the entire height of material 12, heating would be applied in the same position as that for a bend. Heat concentrator 190 may be moved to any portion of the vertical side of material 12 by the computer control system.

In the current embodiment heat concentrator 190 is manufactured of a ceramic fused coating such as aluminum oxide or the equivalent. Heat concentrator 190 is powered by an electrical source having a frequency range of 20 to 100 kHz and power up to 10 kW. This permits the material to be heated to temperatures in excess of 1300 degrees Fahrenheit. Electricity is carried to heat concentrator 190 by charge conductor pipes 484. Charge conductor pipes 484 comprise sections of copper pipe, soldered together. Due to the heat generated by heat concentrator 190, a coolant is circulated through the interior of charge conductor pipes 484 by heating unit 114, to prevent the solder from melting.

As heating unit 114 is electrically powered, it can be easily adjusted by the computer control system (see FIG. 14) to heat for a precise time at a precise wattage. This allows for the adjustment of the amount of heat required for various types of material as well as applying differing amounts of heat to the same material. For example, a sharpened edge may be hardened and require more heat to reduce or eliminate fractures when being nicked. The body of the same material may not be hardened and require less heat to be bent. The inventors have found that this heating configuration works quite well in heating materials to be bent, in particular steel. Further, the use of a single heat concentrator 190 rather than a heater that brackets material 12 reduces any interference between heating unit 114 and material 12 as it is forwarded from bending tool 106. It is not the intent of the inventors to restrict the use of a heater in the present invention to the precise configuration of the current embodiment as many heater configurations may be utilized.

Figure 14A:
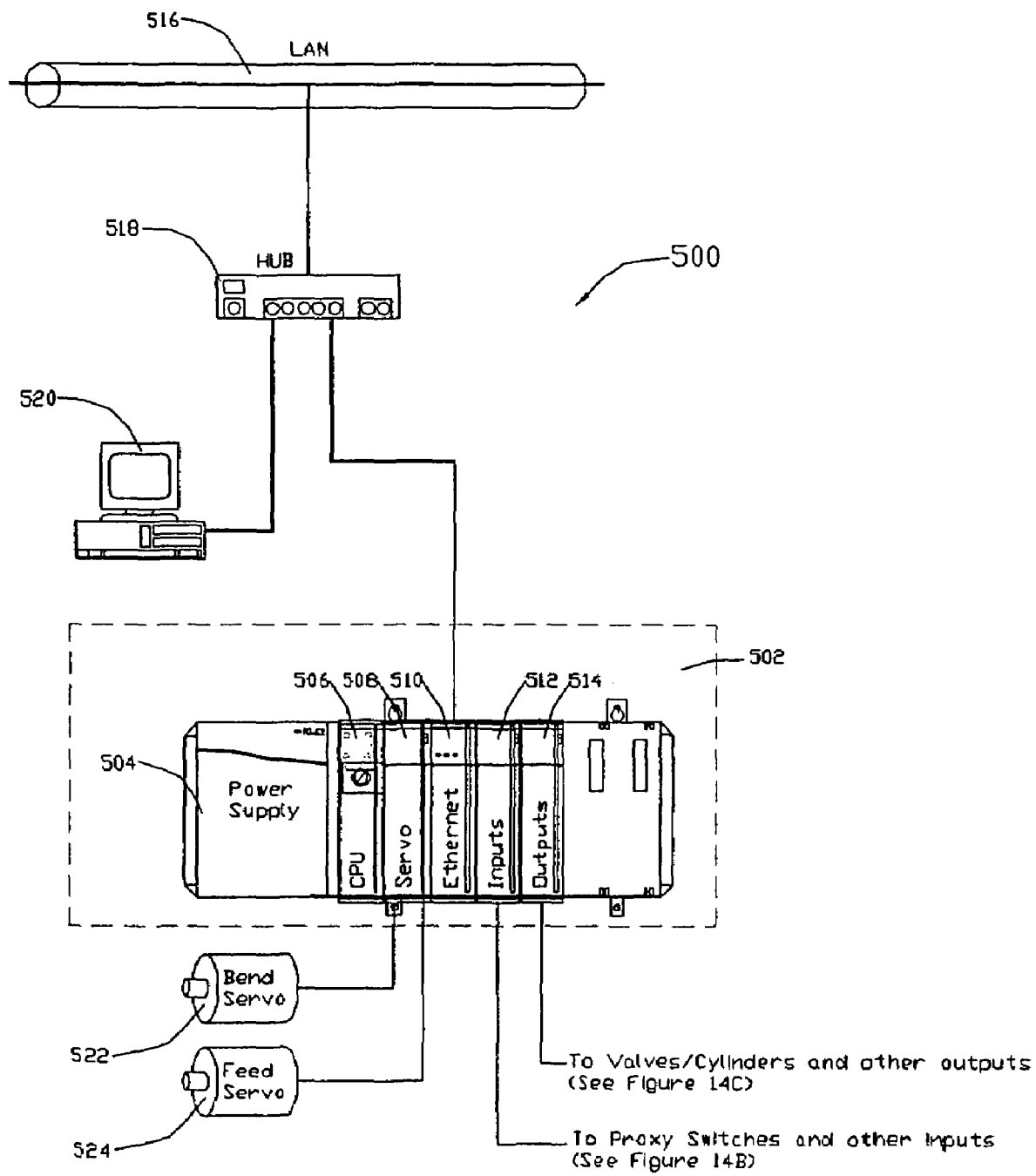
FIGS. 14a, 14c and 14b are a schematic diagram of the computer control system.
Figure 14B:
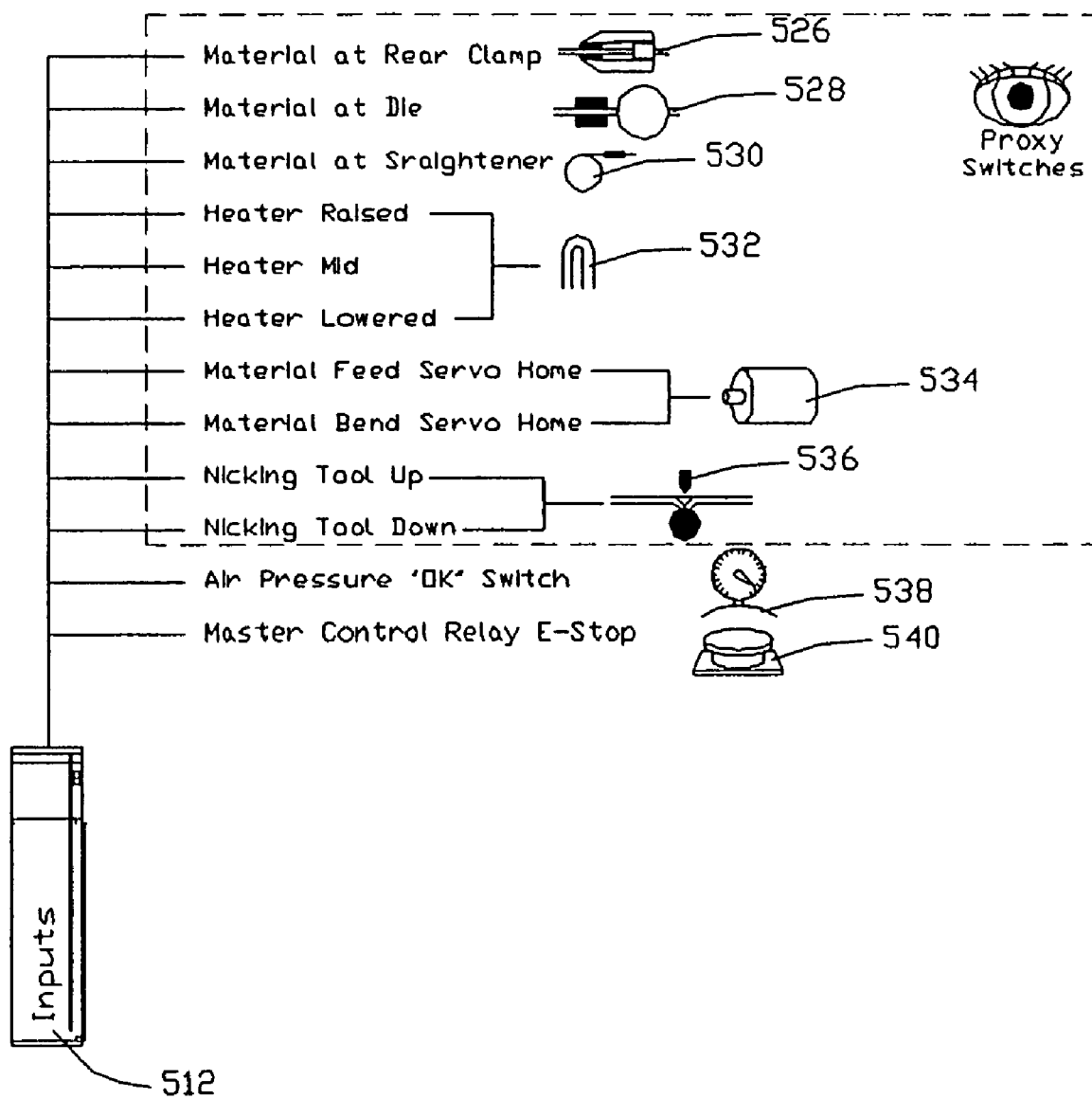
Figure 14C:
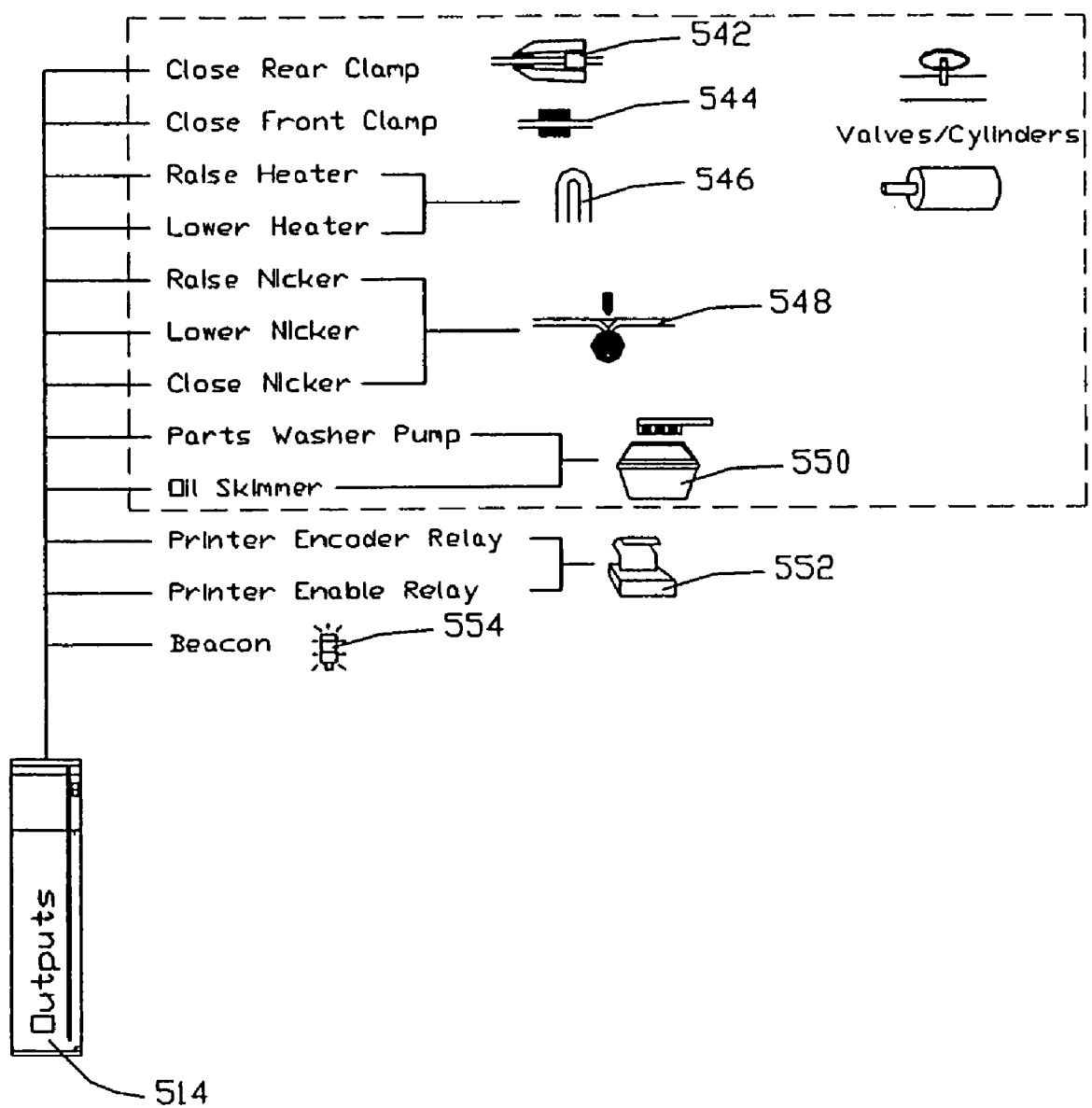

Referring now to FIGS. 14a, 14b and 14c, a schematic diagram of the computer control system of the present invention is shown generally as 500. System 500 makes use of a Programmable Logic Controller (PLC) 502. PLC 502 comprises a power supply 504, a CPU 506, a servo controller 508, a communications card 510, an input controller 512 and an output controller 514. Communications card 510 connects PLC 502 to a Local Area Network (LAN) 516 through the use of a communications hub 518. In the current embodiment LAN 516 makes use of the Ethernet protocol but any number of other protocols may be utilized. Also connected to LAN 516 via hub 518 is a control PC 520. Control PC 520 is used to direct the actions of PLC 502. PC 520 maintains a database of cutting die patterns. In use, an operator selects a cutting die pattern using PC 520 and the number of dies to be manufactured for that pattern. All required information for the bending machine 100 to create the dies is downloaded to PLC 502. Required information includes the number of dies to be made, the bending and heating characteristics of the material, segment distance between bends, the bend points, the degree of each bend, and the nicking points. This information is downloaded in the form of a modified Data Exchange File (DXF). Based upon the downloaded information, PLC 502 then directs bending machine 100 to manufacture the required number of dies for each pattern. As PC 520 is connected to LAN 516 it may receive patterns from or transmit patterns to any other device connected to LAN 516.

Returning to PLC 502, we will now discuss each component in more detail. Power supply 504 provides the power for PLC 502. CPU 506 controls the overall processing of PLC 502. Servo controller 508 controls bend servo 522 and feed servo 524. Bend servo 522 drives bending tool 106 and feed servo 524 controls material feeder 104 (see FIG. 3). As mentioned earlier communications card 510 connects PLC 502 to hub 518 and thus to control PC 520. Input controller 512 controls a plurality of inputs as shown in FIG. 14b. The inputs under control are labeled as features 526 to 540. Features 526 to 536 are proxy switches and are thus grouped together in a dashed rectangle within FIG. 14b. Each input device determines the status of a component of the bending machine. To aid the reader in understanding which components each input device monitors we suggest the reader refer to FIG. 3. Rear clamp switch 526 detects if there is material in material feeder 104. Bending tool switch 528 determines if there is material at bending tool 106. Straightener switch 530 determines if there is material at straightener 110. Heater switch 532 comprises a set of three separate switches which determine the position of the heating unit 114, specifically if heating unit 114 is raised, lowered or in mid-position. Material feed switch 534 comprises a set of two switches, which determine if bend servo 522 or feed servo 524, are in the home position. Nicking tool switch 536 comprises a set of two switches, which determine if nicking tool 116 is in the up or down position. Air pressure switch 538 determines if air pressure is sufficient to operate the various components of the bending machine that are pneumatically powered. Finally, master control stop switch 540 detects if the emergency stop button has been pressed by the operator.

Output controller 514 controls a plurality of devices, as shown in FIG. 14c. These devices are indicated by features 542 to 554. Features 542 to 550 are pneumatically powered by the use of a cylinder and valve and are thus grouped together in a dashed rectangle. Rear clamp control 542 controls the clamp utilized by feeder control 104 to clamp material 12. Front clamp control 544 controls forward feeder clamp 162. Heater control 546 comprises a set of two controls, the first raises heating unit 114, the second lowers it. Nicker control 548 comprises a set of three controls, which raise, lower or close nicker 116. Cleaner control 550 comprises a set of two controllers. The first controller operates a pump to send a cleaning solution through spray nozzles 244 of material cleaner 108 (see FIG. 7). The second controller operates a skimmer to remove oil from the surface of the used cleaning solution so that the cleaning solution may be reused. Printer control 552 directs the printing of printing unit 164. Beacon control 554 controls beacon light 128 to indicate the operating status of the bending machine.

Figure 15A:
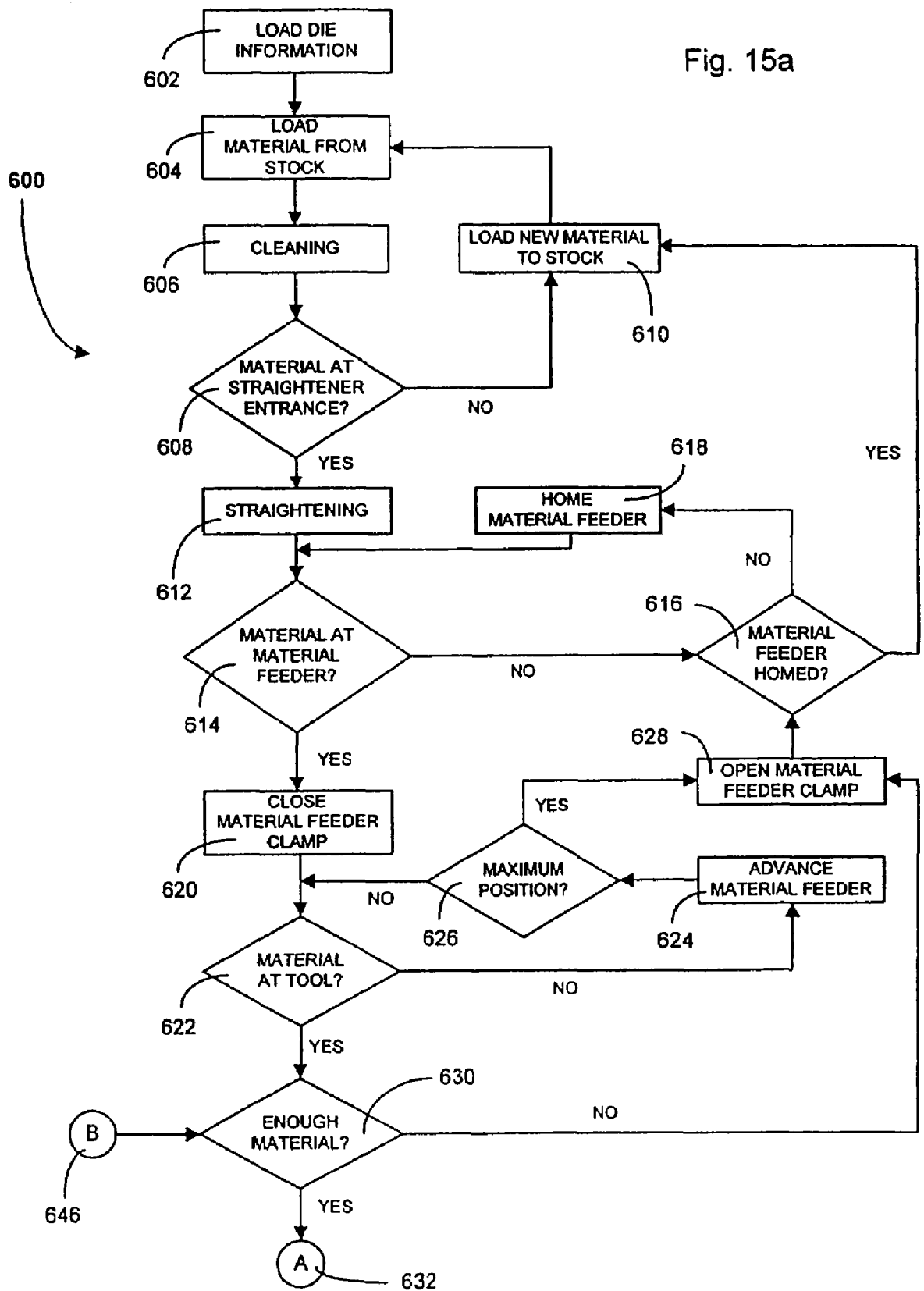
FIGS. 15a and 15b are flowcharts of the bending process.
Figure 15B:
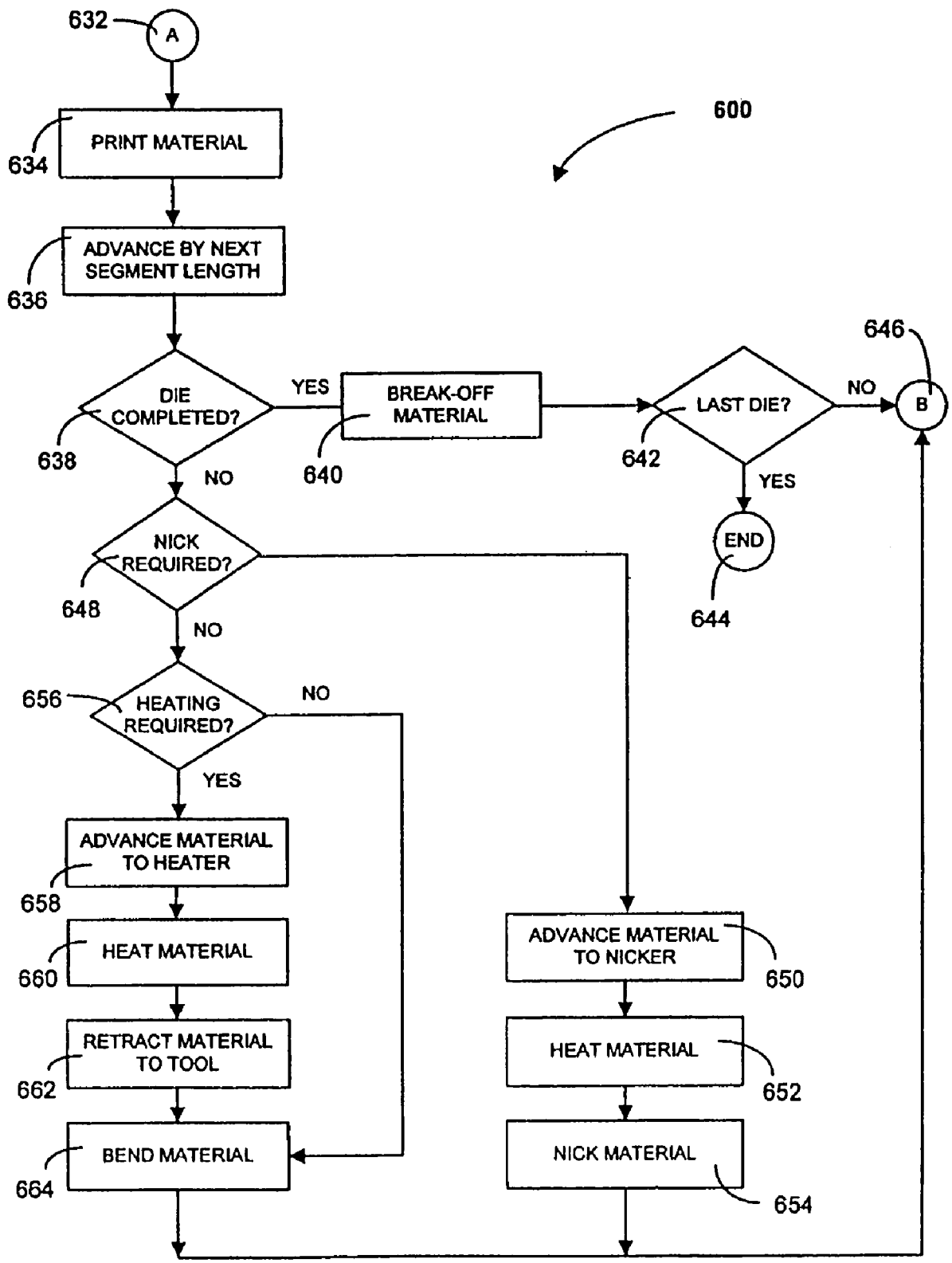

Referring now to FIGS. 15a and 15b a flowchart of the bending process is shown generally as 600. Beginning at step 602 required information regarding the die to be constructed is downloaded from control PC 520 to PLC 502. Required information includes the number of dies to be made, the bending and heating characteristics of the material, segment distance between bends, the bend points, the degree of each bend, and the nicking points. At step 604 material 12 is loaded manually by the operator from material coil 154 until material 12 encounters material feeder 104. Next at step 606 material 12 is cleaned by material cleaner 108. At step 608 a test is made to determine if material 12 is available at the entrance to material straightener 110. If not, material coil 154 is empty and processing moves to step 610 where a new coil of material is loaded. From step 610 processing then returns to step 604. If the test result at step 608 is positive, processing moves to step 612 where material 12 is straightened. Next a test is made at step 614 to determine if material 12 is at material feeder 104. If the test result is negative, processing moves to step 616, where a test is made to determine if material feeder 104 is in a home position. If this test result is positive, processing moves to step 610 then to step 604. If at step 616 the test result is negative, processing moves to step 618 where the material feeder 104 is returned to a home position. Processing after step 618 then returns to the test at step 614. If at step 614 the test result is positive, material feeder 104 is instructed at step 620 to clamp material 12. Processing then moves to step 622 where a test is made to determine if material 12 is at bending tool 106. If the result of this test is negative, processing moves to step 624 where material 12 is advanced by material feeder 104. A test is then made at step 626 to determine if the material feeder 104 has reached a maximum position, if it has, processing moves to step 628 where the material feeder clamp is opened and processing continues to step 616. If at step 616 it is found that the material feeder is not in the maximum position, processing returns to step 622. After step 622 a test is made at step 630 to determine if the material feeder 104 is in a position to provide enough material 12 for the next bend or nick. If the result of this test is negative, processing moves to step 628 where the material feeder clamp is opened, and processing then moves on to step 616 as discussed earlier. If the result of the test at step 630 is positive, control moves to step 634 of FIG. 15b as shown by connector 632.

At step 634 of FIG. 15b, material 12 is printed with print information. At step 636, material 12 is advanced by the next segment length. A segment length is the amount of material before the next nick or bend. If the last operation was a nick, the amount of material ahead of the bending tool 106 is taken into account in determining how much material should be advanced. If a nick has just be created it is also possible that the material may be retracted from the nicking head should the next bend or nick be relatively close to the nick just created. Processing then moves to step 638 where a test is made to determine if the cutting die has been completed, if it has, processing moves to step 640 where material 12 is broken off at bending tool 106 to complete the die. A test is then made at step 642 to determine if this is the last die of the cutting die pattern. If so, processing ends at step 644.

Returning now to step 638. If at step 638 it is determined that the die is not complete, processing moves to step 648 where a test is made to determine if a nick is required. If a nick is required, processing moves to step 650 where material 12 is advanced to nicking tool 116. Processing next moves to step 652 where material 12 is heated by heating unit 114 prior to nicking. At step 654 material 12 is nicked by nicking tool 116 and then processing moves to step 630 of FIG. 15a via transfer 646. Returning to step 648 if a nick is not required processing moves to step 656 where a test is made to determine if material 12 must be heated prior to bending. If no heating is required, processing moves to step 664, where material 12 is bent by bending tool 106. If heating is required, processing moves to step 658 where material 12 is advanced to heating unit 114. At step 660 material 12 is heated and at step 662 the now heated material 12 is retracted to bending tool 106. At step 664, heated material 12 is bent, by bending tool 106.

Although the invention has been described with reference to certain specific embodiments, various modifications thereof will be apparent to those skilled in the art without departing from the spirit and scope of the invention as outlined in the claims appended hereto.

The invention claimed is:

1. A bending machine for producing cutting dies from material, said bending machine comprising:
 a) a feeder for accepting said material;
 b) a bending tool accepting said material from said feeder for bending,
 c) a support surface for supporting said material upon output from said bending tool,
 d) a heating unit, and
 e) a nicking unit,
  wherein said heating unit and said nicking unit are disposed on intersecting planes such that said material need not be moved once in position to engage either or both of said heating unit and said nicking unit.

2. The machine of claim 1 further comprising a supply device having a turntable for supporting a coil of said material.

3. The machine of claim 2 wherein said turntable operates in both forward and reverse directions.

4. The machine of claim 1 wherein said feeder is a clamping device, which when engaged clamps firmly to each side of said material and when disengaged does not contact said material.

5. The machine of claim 4 wherein said feeder is driven along a feeder screw and a guide, to ensure said material passes linearly through said machine.

6. The machine of claim 1 further comprising a forward clamping device adjacent said bending tool, said forward clamping device engaging said material when said feeder is disengaged.

7. The machine of claim 1 further comprising a straightener wherein said straightener comprises a series of front and rear rollers, said rear rollers each being installed in an insert, the distance between said front and rear rollers being adjustable by a tightening bolt applied to an insert.

8. The machine of claim 1 wherein said heating unit comprises a heat concentrator, said heat concentrator having a head positioned adjacent to said material prior to heating.

9. The machine of claim 8 wherein said heating unit may be instructed to heat all or a portion of an edge of said material.

10. The machine of claim 8 wherein said heating unit comprises a heat concentrator and a shoe guide, said shoe guide designed to direct said material to said heat concentrator.

11. The machine of claim 1 said nicking unit utilizing a male die and a female die.

12. The machine of claim 11 wherein said female die has a plurality of nicking forms, said female die being adjustable to match a nicking form with said male die.

13. The machine of claim 1 further comprising a printing unit, said printing unit located before said bending tool to print information on said material.

14. A bending machine for producing cutting dies from material, said bending machine comprising:
   a) a feeder for accepting said material;
   b) a bending tool accepting said material from said feeder for bending,
   c) a support surface for supporting said material upon output from said bending tool, and
   d) a material cleaner
   wherein said material cleaner is connected to said bending machine by a bracket having a plurality of pivot points, said pivot points permitting said material cleaner to adjust to bends in said material.

15. A method of creating a cutting die for a work product, said method comprising the steps of:
   a) extracting material from a source of material;
   b) feeding said material to a bending tool;
   c) bending said material;
   d) supporting said material after bending;
   e) repeating steps a) through d) until said cutting die is complete;
   f) detaching said cutting die from said source of material, after the completion of step e); and
   g) nicking said material to incorporate notches in the work product.

16. The method of claim 15 further comprising the step of cleaning said material after said material has been extracted from said source of material and prior to feeding said material.

17. The method of claim 15 further comprising the step of straightening said material once said material has been extracted from said source of material but before bending said material.

18. The method of claim 15 further comprising the step of advancing said material past said bending tool prior to nicking said material and thereafter retracting said material toward said bending tool.

* * * * *